(12) United States Patent
Lindemann et al.

(10) Patent No.: US 11,390,261 B2
(45) Date of Patent: Jul. 19, 2022

(54) HYBRID MODULE

(71) Applicant: Schaeffler Technologies AG & Co. KG, Herzogenaurah (DE)

(72) Inventors: Patrick Lindemann, Wooster, OH (US); Matthew Payne, Glenmont, OH (US)

(73) Assignee: Schaeffler Technologies AG & Co. KG, Herzogenaurah (DE)

( * ) Notice: Subject to any disclaimer, the term of this patent is extended or adjusted under 35 U.S.C. 154(b) by 198 days.

(21) Appl. No.: 16/527,686

(22) Filed: Jul. 31, 2019

(65) Prior Publication Data

US 2020/0039496 A1 Feb. 6, 2020

Related U.S. Application Data

(60) Provisional application No. 62/719,268, filed on Aug. 17, 2018, provisional application No. 62/717,054, filed on Aug. 10, 2018, provisional application No. 62/713,584, filed on Aug. 2, 2018.

(51) Int. Cl.
*B60W 10/02* (2006.01)
*F16D 28/00* (2006.01)
*B60W 10/08* (2006.01)

(52) U.S. Cl.
CPC .......... *B60W 10/023* (2013.01); *B60W 10/08* (2013.01); *F16D 28/00* (2013.01); *B60W 2510/0233* (2013.01)

(58) Field of Classification Search
None
See application file for complete search history.

(56) References Cited

U.S. PATENT DOCUMENTS 5,720,475 A * 2/1998 Duclos ............. F16F 15/13128
192/201
5,761,970 A * 6/1998 Bonfilio ............ F16F 15/13142
192/70.14
(Continued)

FOREIGN PATENT DOCUMENTS

JP 2003070207 A 3/2003
JP 2003154862 A 5/2003
(Continued)

OTHER PUBLICATIONS

Payne et al., U.S. Appl. No. 16/029,992, filed Jul. 9, 2019.

*Primary Examiner* — Colby M Hansen (57) ABSTRACT

A hybrid module includes a housing, an electric motor, a hydraulic coupling, a first clutch, a second clutch, and a flow plate assembly. The electric motor includes a stator fixed to the housing and a rotor rotatable relative to the housing. The hydraulic coupling is at least partially radially inside of the electric motor. The first clutch is for drivingly connecting the rotor to the engine. The second clutch is arranged in parallel with the hydraulic coupling for drivingly connecting the rotor to an input shaft of the planetary transmission. The flow plate assembly is fixed to the housing and includes a first flow plate and a second flow plate. The first flow plate has a radial groove forming a first portion of a radial flow channel. The second flow plate is fixed to the first flow plate and forms a second portion of the radial flow channel.

12 Claims, 4 Drawing Sheets

(56) References Cited

U.S. PATENT DOCUMENTS

| | | | | |
|---|---|---|---|---|
| 5,873,445 | A * | 2/1999 | Haberbusch | F16F 15/165 |
| | | | | 192/208 |
| 6,299,541 | B1 * | 10/2001 | Bertin | F16F 15/13164 |
| | | | | 192/214 |
| 8,459,425 | B2 * | 6/2013 | Ruder | F16D 13/644 |
| | | | | 192/48.8 |
| 8,978,799 | B2 * | 3/2015 | Arnold | B60K 6/387 |
| | | | | 180/65.22 |
| 2008/0108469 | A1 * | 5/2008 | Weinschenker | F16H 57/0434 |
| | | | | 475/72 |
| 2010/0081540 | A1 | 4/2010 | Krause et al. | |
| 2011/0177906 | A1 * | 7/2011 | Misu | B60L 50/61 |
| | | | | 475/263 |
| 2011/0315501 | A1 * | 12/2011 | Reinhart | F16F 15/123 |
| | | | | 192/70.17 |
| 2012/0242199 | A1 | 9/2012 | Iwase et al. | |
| 2012/0258838 | A1 | 10/2012 | Hartz et al. | |
| 2012/0319514 | A1 | 12/2012 | Iwase et al. | |
| 2014/0124321 | A1 * | 5/2014 | Frait | B60K 6/405 |
| | | | | 192/66.3 |
| 2014/0151181 | A1 * | 6/2014 | Reimnitz | F16F 15/31 |
| | | | | 192/30 V |

FOREIGN PATENT DOCUMENTS

| | | |
|---|---|---|
| JP | 2012086827 | 5/2012 |
| JP | 2021533023 A | 12/2021 |

* cited by examiner

HYBRID MODULE

CROSS-REFERENCE TO RELATED APPLICATIONS

This application claims the benefit of U.S. Provisional Patent Application Nos. 62/713,584, filed Aug. 2, 2018, 62/717,054, filed Aug. 10, 2018, and 62/719,268, filed Aug. 17, 2018, the disclosures of which are incorporated in their entirety by reference herein.

TECHNICAL FIELD

The present disclosure relates generally to a hybrid module, and more specifically to a torque converter and electric motor configuration in a hybrid module.

BACKGROUND

Hybrid modules are known. One example is shown in commonly-assigned copending U.S. patent application Ser. No. 16/029,992 titled OIL DISTRIBUTION IN A HYBRID MODULE TO USE CLUTCH COOLING TO COOL E-MOTOR ROTOR AND STATOR filed Jul. 9, 2018.

SUMMARY

Example embodiments broadly comprise a hybrid module with a housing, an electric motor, a hydraulic coupling, a first clutch, a second clutch, and a flow plate assembly. The housing arranged for fixing to a planetary transmission and an engine. The electric motor is disposed in the housing and includes a stator fixed to the housing and a rotor rotatable relative to the housing. The hydraulic coupling is disposed in the housing and at least partially radially inside of the electric motor. The first clutch is for drivingly connecting the rotor to the engine. The second clutch is arranged in parallel with the hydraulic coupling for drivingly connecting the rotor to an input shaft of the planetary transmission. The flow plate assembly is fixed to the housing and includes a first flow plate and a second flow plate. The first flow plate has a radial groove forming a first portion of a radial flow channel. The second flow plate is fixed to the first flow plate and forms a second portion of the radial flow channel.

In some example embodiments, the second flow plate has a radially inner orifice. The first flow plate and the second flow plate are fixed together radially inside of the radially inner orifice. In some example embodiments, the hybrid module has a sealing hub and a drive hub. The sealing hub is fixed to the flow plate assembly. The drive hub is arranged for driving connection with the engine and the first clutch. The sealing hub has a first flow channel hydraulically connected with the radially inner orifice. The drive hub has a second flow channel hydraulically connected to the first flow channel. The sealing hub or the drive hub has a circumferential groove. The first flow channel and the second flow channel are hydraulically connected at the circumferential groove. The sealing hub is sealed to the drive hub on first and second opposite axial sides of the circumferential groove. In an example embodiment, the hybrid module has a lip seal with a garter spring, and first and second dynamic seals. Each of the lip seal and the first and second dynamic seals are for directly sealing the sealing hub to the drive hub.

In some example embodiments, the first clutch has a first piston, a second piston, and an apply chamber. The second piston is sealed to the first piston, rotationally fixed to the first piston, and axially displaceable relative to the first piston. The apply chamber is arranged axially between the first piston and the second piston for applying the first clutch. The radial flow channel is hydraulically connected to the apply chamber. In an example embodiment, at least one of the first piston or the second piston includes a plate, a friction material ring, and a flow orifice. The friction material ring is fixed to the plate and includes at least one friction material groove. The flow orifice extends through the plate and the friction material ring to the at least one friction material groove.

In some example embodiments, the hybrid module includes a first backing plate and a second backing plate. The first backing plate is rotationally fixed to the rotor and arranged for sealing to the input shaft of the planetary transmission. The second backing plate is rotationally fixed to the rotor and arranged for radially positioning the rotor relative to the housing. The first clutch is disposed axially between the first backing plate and the second backing plate. In an example embodiment, the first backing plate includes a radially inner portion with first and second axially opposed circumferential grooves, and first and second seals disposed in the first and second axially opposed circumferential grooves, respectively. In an example embodiment, the hybrid module includes a diverter plate fixed to the second backing plate. The first clutch has a first piston and the diverter plate is for providing a balancing oil to the first piston.

In some example embodiments, the hybrid module includes a sealing hub fixed to the flow plate assembly, and a bearing arranged radially between the sealing hub and the second backing plate for radially positioning the rotor relative to the housing. In an example embodiment, the hybrid module includes a drive hub, sealed to the sealing hub and arranged for driving connection to the engine. The first clutch has a first piston fixed to the drive hub.

Other example embodiments broadly comprise a flywheel assembly for a hybrid module including a flywheel, an arcuately-shaped coil spring, and a cover plate. The flywheel is arranged for fixing to an engine and includes a toroidal groove. The arcuately-shaped coil spring is disposed in the toroidal groove. The cover plate is fixed to the flywheel and arranged to axially retain the arcuately-shaped coil spring in the toroidal groove. In an example embodiment, the flywheel assembly has a shell disposed radially between the toroidal groove and the arcuately-shaped coil spring. In some example embodiments, the flywheel assembly has a flange drivingly engaged with the arcuately-shaped coil spring. The cover plate has a first cylindrical protrusion and the flange has a second cylindrical protrusion, radially inside of and at least partially axially aligned with the first cylindrical protrusion. In an example embodiment, the second cylindrical protrusion comprises a spline. In an example embodiment, the flywheel assembly includes a ring gear fixed to the flywheel and arranged for driving connection with a starter motor to start the engine.

According to one embodiment, a hybrid module may include a housing, a bulkhead, a torque converter, a hub, and a first clutch plate. The bulkhead is fixed to the housing and includes a radially inner cylindrical protrusion. The torque converter has a hydraulic coupling arrangement with an impeller and a turbine. The hub is arranged for radial positioning by an engine crankshaft and in driving engagement with the engine crankshaft. The first clutch plate is fixed to the hub and arranged for releasably connecting the engine to the torque converter. According to one embodiment, the first clutch plate is sealed to the bulkhead.

According to one embodiment, the hybrid module has a first cover, fixed to the impeller and radially positioned by the bulkhead. According to one embodiment, the hybrid module has a bearing disposed radially between the first cover and the bulkhead. According to one embodiment, the hybrid module has a second clutch plate, drivingly engaged with the first cover. The first cover is disposed on a first axial side of the first clutch plate and the second clutch plate is disposed on a second axial side of the first clutch plate, opposite the first side. According to one embodiment, the hybrid module has a first piston on the second axial side of the second clutch plate and arranged for clamping the first cover, the first clutch plate, and the second clutch plate to connect the engine to the torque converter. According to one embodiment, the first piston is drivingly engaged with the first clutch plate.

According to one embodiment, the hybrid module has a second cover, fixed to the impeller and arranged for sealing to a transmission input shaft. According to one embodiment, the hybrid module has a third clutch plate, a fourth clutch plate, and a second piston. The third clutch plate is drivingly engaged with the second cover. The fourth clutch plate is drivingly engaged with the turbine. The second piston is disposed axially between the second cover and the fourth clutch plate, drivingly engaged with the second cover, and arranged for clamping the third clutch plate and the fourth clutch plate to connect the turbine to the impeller.

According to one embodiment, the hybrid module has a spring retainer and a mass element. The spring retainer is arranged for fixing to the engine crankshaft. The mass element is fixed to the spring retainer and includes a starter gear. The mass element is cylindrical and encircles the spring retainer.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
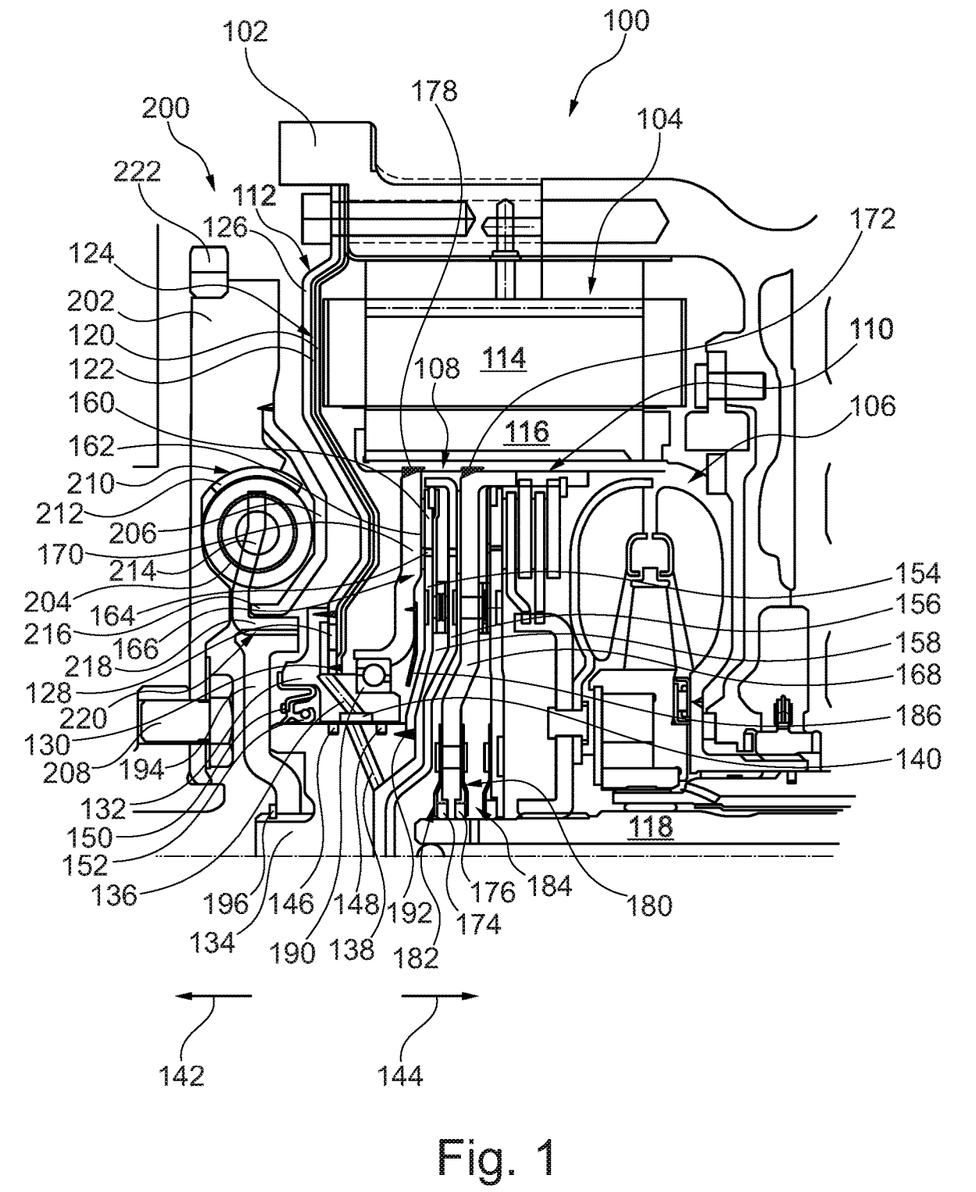
FIG. 1 illustrates a top-half cross-sectional view of a hybrid module according to an example aspect of the disclosure.

The following description is made with reference to FIG. 1. FIG. 1 illustrates a top-half cross-sectional view of hybrid module 100 according to an example aspect of the disclosure. Hybrid module 100 includes housing 102, electric motor 104, hydraulic coupling 106, clutch 108, clutch 110, and flow plate assembly 112. The housing is arranged for fixing to a planetary transmission (not shown) and an engine (not shown). The electric motor is disposed in the housing and includes stator 114, fixed to the housing, and rotor 116 rotatable relative to the housing. In some embodiments, electric motor 104 is a generator or can function as a motor or a generator. The hydraulic coupling is disposed in the housing and at least partially radially inside of the electric motor. Clutch 108 is for drivingly connecting the rotor to the engine. Clutch 110 is arranged in parallel with the hydraulic coupling for drivingly connecting the rotor to input shaft 118 of the planetary transmission. Flow plate assembly 112 includes flow plate 120 with radial groove 122 forming a first portion of radial flow channel 124 and flow plate 126, fixed to the flow plate 120, forming a second portion of the radial flow channel.

Flow plate 126 includes radially inner orifice 128. Flow plates 120 and 126 are fixed together radially inside of the radially inner orifice by laser weld 130, for example. Although laser welds are shown, other fixing methods such as MIG welds, TIG welds, brazing, mechanical fasteners and/or adhesives may also be used to fix components together. Hybrid module 100 includes sealing hub 132, fixed to the flow plate assembly, and drive hub 134, arranged for driving connection with the engine and clutch 108. The sealing hub includes flow channel 136 hydraulically connected with the radially inner orifice. The drive hub includes flow channel 138 hydraulically connected to flow channel 136. Sealing hub 132 includes circumferential groove 140. Although the circumferential groove is shown in hub 132, in other embodiments hub 134 may include the circumferential groove, or hubs 132 and 134 may both include a circumferential groove. Flow channels 136 and 138 are hydraulically connected at the circumferential groove. Sealing hub 132 is sealed to drive hub 134 on opposite axial sides 142 and 144 of the circumferential groove by respective dynamic seals 146 and 148, for example. Hybrid module 100 includes lip seal, or shaft seal, 150 with garter spring 152 and dynamic seals 146 and 148. Each of the lip seal and the dynamic seals are for directly sealing the sealing hub to the drive hub.

Clutch 108 includes piston 154, piston 156, and apply chamber 158. Piston 156 is sealed to piston 154, rotationally fixed to piston 154, and axially displaceable relative to piston 154. Apply chamber 158 is arranged axially between pistons 154 and 156 for applying clutch 108. Radial flow channel 124 is hydraulically connected to the apply chamber. Piston 154 includes plate 160, friction material ring 162, and flow orifice 164. The friction material ring is fixed to the plate and includes friction material groove 166. The flow orifice extends through the plate and the friction material ring to the friction material groove. Similarly, piston 156 includes a plate, ring, and orifice, similar to piston 154. Although both pistons are shown with orifices, some embodiments may include only one piston with an orifice.

Hybrid module 100 includes backing plates 168 and 170. Backing plate 168 is rotationally fixed to the rotor at laser weld 172, for example, and arranged for sealing to the input shaft of the planetary transmission by seals 174 and 176, for example. Backing plate 170 is rotationally fixed to the rotor at laser weld 178, for example, and arranged for radially positioning the rotor relative to the housing as described in more detail below. Clutch 108 is disposed axially between the backing plate 168 and backing plate 170. Backing plate 168 includes radially inner portion 180 with axially opposed circumferential grooves 182 and 184. Seals 174 and 176 are disposed in grooves 182 and 184, respectively. Hybrid module 100 includes diverter plate 186, fixed to backing plate 170, for providing a balancing oil to piston 154.

Sealing hub 132 is fixed to flow plate assembly 112 by laser weld 188, for example. Bearing 190 is arranged radially between the sealing hub and backing plate 170 for radially positioning the rotor relative to the housing. Piston 154 is fixed to drive hub 134 by laser weld 192, for example.

Flywheel assembly 200 for hybrid module 100 includes flywheel 202, arcuately-shaped coil spring, or arc spring, 204, and cover plate 206. Flywheel 202 is arranged for fixing to an engine at bolts 208, for example, and includes toroidal groove 210. The arcuately-shaped coil spring is disposed in the toroidal groove. The cover plate is fixed to the flywheel and arranged to axially retain the arcuately-shaped coil spring in the toroidal groove. Flywheel assembly 200 includes shell 212 disposed radially between the toroidal groove and the arcuately-shaped coil spring.

Flywheel assembly 200 includes flange 214 drivingly engaged with the arcuately-shaped coil spring. The cover plate includes cylindrical protrusion 216 and the flange includes cylindrical protrusion 218, radially inside of and at least partially axially aligned with cylindrical protrusion 216. Cylindrical protrusion 218 includes spline 220 engaged with a mating spline on drive plate 194. Plate 194 is drivingly engaged with drive hub 134 and axially secured by ring 196 installed in a groove in the hub. Flywheel assembly 200 includes ring gear 222, fixed to the flywheel and arranged for driving connection with a starter motor to start the engine. Hybrid module 100 and flywheel assembly 200 are configured such that, during assembly, the flywheel assembly is installed on the engine and the hybrid module is installed on the transmission. As the engine and transmission are mated, plate 194 is installed in flange 214 and spline 220 provides a rotational connection between the flywheel assembly and hybrid module. After mating, bolts (not shown) are installed to secure the transmission/hybrid module to the engine.

Figure 2:
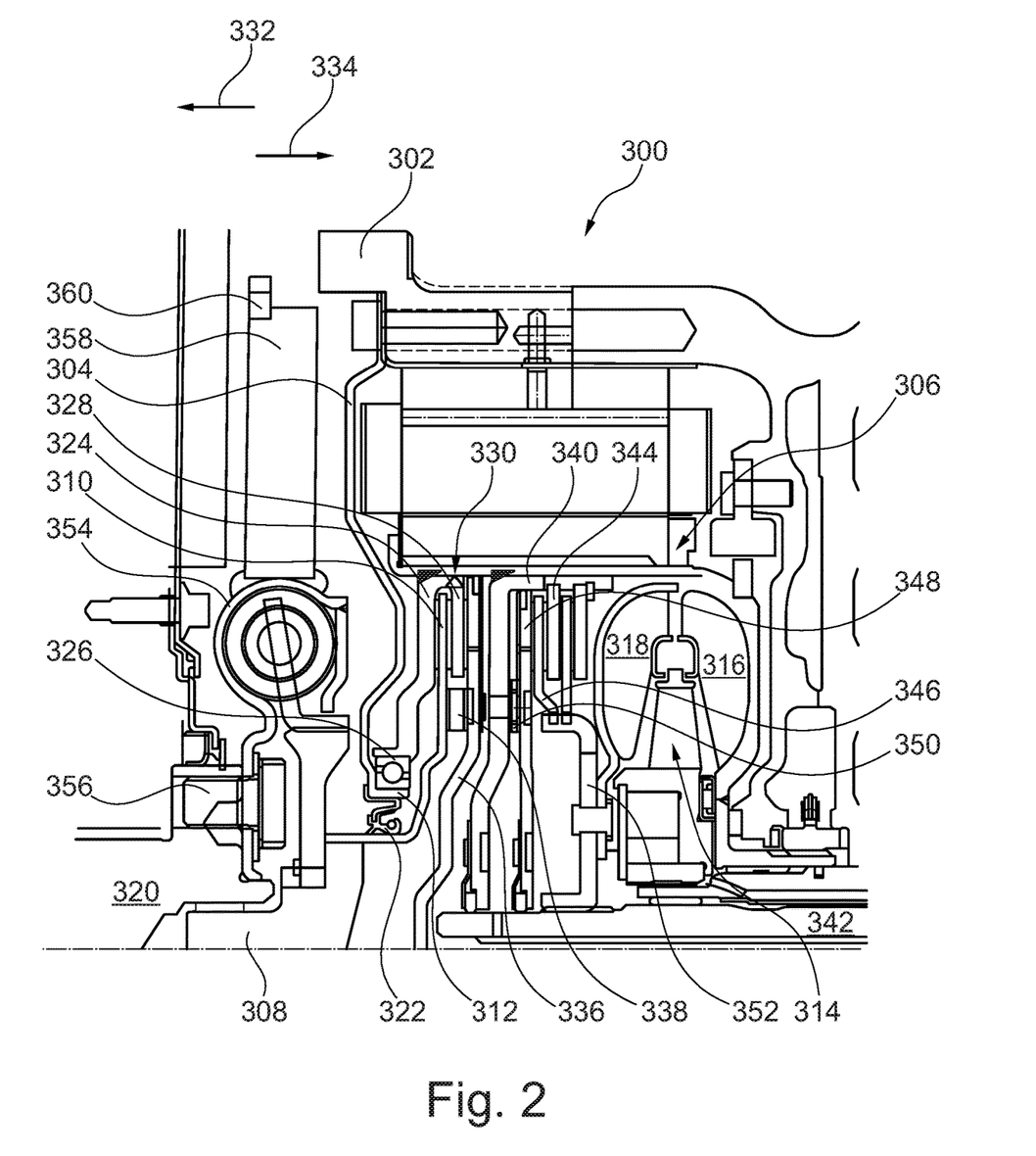
FIG. 2 illustrates a top half cross-sectional view of a hybrid module according to an example aspect of the disclosure.

The following description is made with reference to FIG. 2. FIG. 2 illustrates a top half cross-sectional view of hybrid module 300 according to an example aspect of the disclosure. Hybrid module 300 includes housing 302, bulkhead 304, torque converter 306, hub 308, and clutch plate 310. The bulkhead is fixed to the housing and includes radially inner cylindrical protrusion 312. The torque converter has hydraulic coupling arrangement 314 with impeller 316 and turbine 318. The hub is arranged for radial positioning by engine crankshaft 320 and in driving engagement with the engine crankshaft. The clutch plate is fixed to the hub and arranged for releasably connecting the engine to the torque converter. The clutch plate is sealed to the bulkhead by seal 322, for example. The hybrid module also includes cover 324, fixed to the impeller and radially positioned by the bulkhead. Bearing 326 is disposed radially between the first cover and the bulkhead.

Hybrid module includes clutch plate 328, drivingly engaged with cover 324 at tabbed connection 330. Cover 324 is disposed on axial side 332 of clutch plate 310 and clutch plate 328 is disposed on axial side 334 of clutch plate 310, opposite axial side 332. Piston 336 is axial side 334 of clutch plate 328 and arranged for clamping cover 324, clutch plate 310, and clutch plate 328 to connect the engine to the torque converter. Piston 336 is drivingly engaged with clutch plate 310 via leaf spring 338, for example.

Hybrid module 300 includes cover 340, fixed to the impeller and arranged for sealing to transmission input shaft 342. Hybrid module 300 also includes clutch plate 344, clutch plate 346, and piston 348. Clutch plate 344 is drivingly engaged with cover 340. Clutch plate 346 is drivingly engaged with the turbine. Piston 348 is disposed axially between the cover 340 and clutch plate 346, drivingly engaged with cover 340 via leaf spring 350, for example, and arranged for clamping clutch plates 344 and 346 to connect the turbine to the impeller via turbine hub 352, for example.

Hybrid module 300 includes spring retainer 354 arranged for fixing to the engine crankshaft via bolts 356, for example, and mass element 358, fixed to the spring retainer and including starter gear 360. Mass element 358 is cylindrical and encircles the spring retainer.

Figure 3:
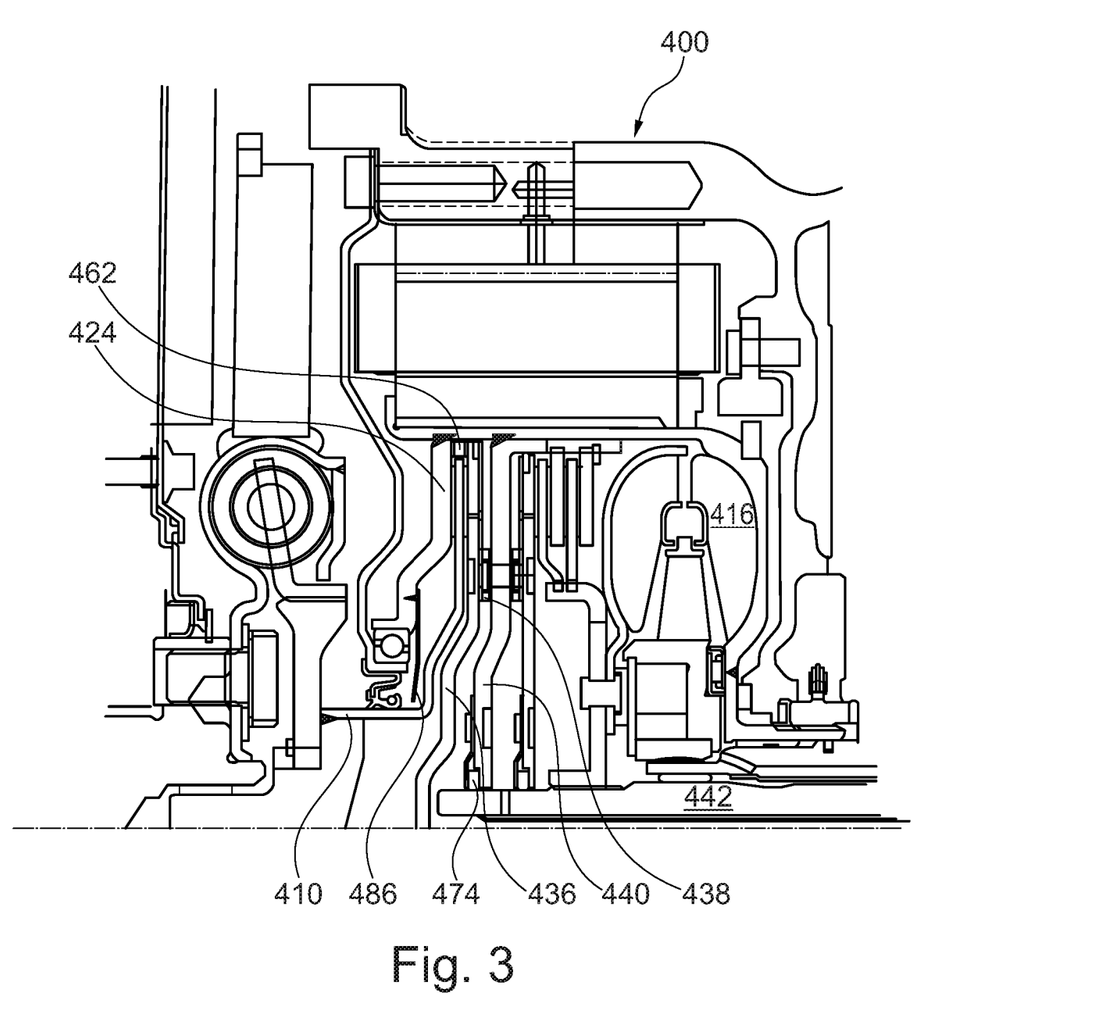
FIG. 3 illustrates an alternative embodiment of the top half cross-sectional view of the hybrid module of FIG. 2.

The following description is made with reference to FIG. 3. FIG. 3 illustrates an alternative embodiment of the top half cross-sectional view of hybrid module 300 of FIG. 2. Hybrid module 400 includes piston 436 arranged for clamping cover 424 and clutch plate 410 to connect the engine to the torque converter. Piston 436 is drivingly engaged with cover 440 via leaf spring 438, for example. Release spring 462 is a wave washer, for example, arranged to displace piston 436 away from cover 424 when the clutch is disengaged. Cover 440 is fixed to impeller 416 and arranged for sealing to transmission input shaft 442 by seal 474, for example. Diverter plate 486 is fixed to cover 424 for providing a balancing oil to piston 436.

Figure 4:
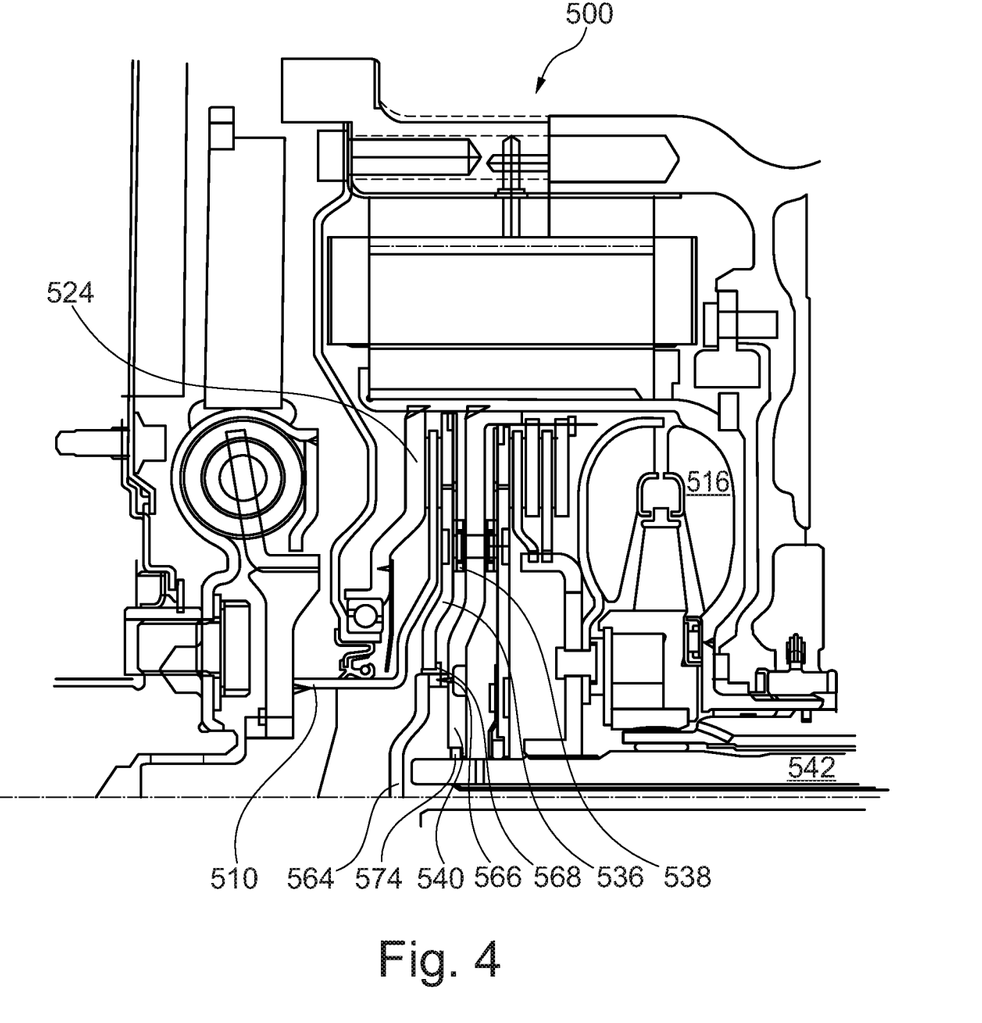
FIG. 4 illustrates an alternative embodiment of the top half cross-sectional view of the hybrid module of FIG. 2.

The following description is made with reference to FIG. 4. FIG. 4 illustrates an alternative embodiment of the top half cross-sectional view of hybrid module 300 of FIG. 2. Hybrid module 500 includes piston 536 arranged for clamping cover 524 and clutch plate 510 to connect the engine to the torque converter. Piston 536 is drivingly engaged with cover 540 via leaf spring 538, for example. Cover 540 is fixed to impeller 516 and arranged for sealing to transmission input shaft 542 by seal 574, for example. End plate 564 is fixed to cover 540 by weld 566, for example. Bushing 568 allows piston 536 to rotate relative to end plate 564. Bushing 568 also limits oil flow between piston 536 and end plate 564.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Housing
104 Electric motor
106 Hydraulic coupling
108 Clutch (first)
110 Clutch (second)
112 Flow plate assembly
114 Stator
116 Rotor
118 Input shaft
120 Flow plate (first)
122 Radial groove
124 Radial flow channel
126 Flow plate (second)
128 Radially inner orifice
130 Laser weld
132 Sealing hub
134 Drive hub
136 Flow channel (sealing hub)
138 Flow channel (drive hub)
140 Circumferential groove
142 Axial side (first)
144 Axial side (second)
146 Dynamic seal (first side)
148 Dynamic seal (second side)
150 Shaft seal
152 Garter spring
154 Piston (first)
156 Piston (second)
158 Apply chamber
160 Plate (piston)
162 Friction material ring
164 Orifice
166 Friction material groove
168 Backing plate (first)
170 Backing plate (second)
172 Laser weld
174 Seal
176 Seal
178 Laser weld
180 Radially inner portion
182 Circumferential groove
184 Circumferential groove
186 Diverter plate
188 Laser weld
190 Bearing
192 Laser weld
194 Drive plate
196 Ring
200 Flywheel assembly
202 Flywheel
204 Arcuately-shaped coil spring
206 Cover plate
208 Engine bolts
210 Toroidal groove
212 Shell
214 Flange
216 Cylindrical protrusion (first)
218 Cylindrical protrusion (second)
220 Spline
222 Ring gear
300 Hybrid module
302 Housing
304 Bulkhead
306 Torque converter
308 Hub
310 Clutch plate (first)
312 Bulkhead cylindrical protrusion
314 Hydraulic coupling
316 Impeller
318 Turbine
320 Engine crankshaft
322 Seal
324 Cover (first)
326 Bearing
328 Clutch plate (second)
330 Tabbed connection
332 Axial side (first)
334 Axial side (second)
336 Piston (first)
338 Leaf spring
340 Cover (second)
342 Transmission input shaft
344 Clutch plate (third)
346 Clutch plate (fourth)
348 Piston (second)
350 Leaf spring
352 Turbine hub
354 Spring retainer
356 Bolts
358 Mass element
360 Starter gear
400 Hybrid module
410 Clutch plate
416 Impeller
424 Cover
436 Piston
438 Leaf spring
440 Cover
442 Transmission input shaft
462 Release spring
474 Seal
486 Diverter plate
500 Hybrid module
510 Clutch plate
516 Impeller
524 Cover
536 Piston
538 Leaf spring
540 Cover
542 Transmission input shaft
564 End plate
566 Weld
568 Bushing
574 Seal

What is claimed is:

1. A hybrid module, comprising:
   a housing arranged for fixing to a planetary transmission and an engine;
   an electric motor disposed in the housing, the electric motor comprising a stator fixed to the housing and a rotor rotatable relative to the housing;
   a hydraulic coupling disposed in the housing and at least partially radially inside of the electric motor;
   a first clutch for drivingly connecting the rotor to the engine;
   a second clutch arranged in parallel with the hydraulic coupling for drivingly connecting the rotor to an input shaft of the planetary transmission; and,
   a flow plate assembly fixed to the housing, the flow plate assembly comprising:
      a first flow plate comprising a radial groove forming a first portion of a radial flow channel; and,
      a second flow plate, fixed to the first flow plate, forming a second portion of the radial flow channel.

2. The hybrid module of claim 1 wherein:
   the second flow plate comprises a radially inner orifice; and,
   the first flow plate and the second flow plate are fixed together radially inside of the radially inner orifice.

3. The hybrid module of claim 2 further comprising:
   a sealing hub, fixed to the flow plate assembly; and,
   a drive hub, arranged for driving connection with the engine and the first clutch, wherein:
      the sealing hub comprises a first flow channel hydraulically connected with the radially inner orifice;
      the drive hub comprises a second flow channel hydraulically connected to the first flow channel;
      the sealing hub or the drive hub comprises a circumferential groove and the first flow channel and the second flow channel are hydraulically connected at the circumferential groove; and,
      the sealing hub is sealed to the drive hub on first and second opposite axial sides of the circumferential groove.

4. The hybrid module of claim 1 wherein the first clutch comprises:
   a first piston;
   a second piston, sealed to the first piston, rotationally fixed to the first piston, and axially displaceable relative to the first piston; and,
   an apply chamber arranged axially between the first piston and the second piston for applying the first clutch, wherein the radial flow channel is hydraulically connected to the apply chamber.

5. The hybrid module of claim 1 further comprising:
   a first backing plate rotationally fixed to the rotor and arranged for sealing to the input shaft of the planetary transmission; and,
   a second backing plate rotationally fixed to the rotor and arranged for radially positioning the rotor relative to the housing, wherein the first clutch is disposed axially between the first backing plate and the second backing plate.

6. The hybrid module of claim 5 wherein the first backing plate comprises:
   a radially inner portion with first and second axially opposed circumferential grooves; and,
   first and second seals disposed in the first and second axially opposed circumferential grooves, respectively.

7. The hybrid module of claim 5 further comprising a diverter plate fixed to the second backing plate, wherein:
   the first clutch comprises a first piston; and,
   the diverter plate is for providing a balancing oil to the first piston.

8. The hybrid module of claim 5 further comprising:
   a sealing hub fixed to the flow plate assembly; and,
   a bearing arranged radially between the sealing hub and the second backing plate for radially positioning the rotor relative to the housing.

9. The hybrid module of claim 8 further comprising:
   a drive hub, sealed to the sealing hub and arranged for driving connection to the engine, wherein the first clutch comprises a first piston fixed to the drive hub.

10. A flywheel assembly for a hybrid module comprising:
    a flywheel arranged for fixing to an engine and comprising a toroidal groove;
    an arcuately-shaped coil spring disposed in the toroidal groove;
    a cover plate, fixed to the flywheel and arranged to axially retain the arcuately-shaped coil spring in the toroidal groove; and
    a flange drivingly engaged with the arcuately-shaped coil spring, wherein:
       the cover plate comprises a first cylindrical protrusion extending in a first axial direction, the first cylindrical protrusion comprising an inner cylindrical surface; and,
       the flange comprises a second cylindrical protrusion extending in a second axial direction, opposite the first axial direction, the second cylindrical protrusion comprising an outer cylindrical surface, radially inside of and at least partially axially aligned with the inner cylindrical surface.

11. The flywheel assembly of claim 10, further comprising a shell disposed radially between the toroidal groove and the arcuately-shaped coil spring.

12. The flywheel assembly of claim 10 further comprising a ring gear fixed to the flywheel and arranged for driving connection with a starter motor to start the engine.

* * * * *